United States Patent [15] 3,644,147
Young, II [45] Feb. 22, 1972

[54] MIXED VALENCY TRANSITION METAL PEROVSKITES AS CATHODIC REDUCTION CATALYSTS

[72] Inventor: Archie R. Young, II, Montclair, N.J.
[73] Assignee: Esso Research and Engineering Company
[22] Filed: Apr. 24, 1969
[21] Appl. No.: 819,107

[52] U.S. Cl. ........................................136/86 D, 136/120 FC
[51] Int. Cl. ..................................H01m 27/04, H01m 13/00
[58] Field of Search ....................136/86, 120, 120 FC, 86 D

[56] References Cited

UNITED STATES PATENTS 3,400,054  9/1968  Ruka et al............................136/86 X
3,404,040  10/1968  Mitoff.....................................136/86

FOREIGN PATENTS OR APPLICATIONS 1,089,104  11/1967  Great Britain.........................136/120
789,089  7/1968  Canada...................................136/86

Primary Examiner—Winston A. Douglas
Assistant Examiner—M. J. Andrews
Attorney—Pearlman and Stahl and Roy J. Ott

[57] ABSTRACT

Ionic crystals having a perovskite structure and comprising a solid solution of oxides of the formulas $ABO_3$ and $A'BO_3$ where A and A' are nontransition metals and B is a transition metal present in two different valency states are effective cathodic electrocatalysts for use in electrochemical cells such as fuel cells.

6 Claims, No Drawings

MIXED VALENCY TRANSITION METAL PEROVSKITES AS CATHODIC REDUCTION CATALYSTS

BACKGROUND OF THE INVENTION

1. Field of the Invention

The present invention concerns nonnoble metal electrocatalysts. More particularly, this invention relates to nonnoble metal catalysts for cathode electrodes in electrochemical cells. In particular, it concerns the use of certain mixed valency transition metal perovskites for the cathodic reduction of an oxidant in a fuel cell.

2. Description of the Prior Art

As used herein, the term "electrochemical cells" refers both the fuel cells and electrolytic cells.

The term "fuel cell" is used herein and in the art to denote a device, system or apparatus wherein the chemical energy of a fluid (i.e., gaseous or liquid) combustible fuel, e.g., hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a fluid fuel into contact with the anode and electrolyte and means for admitting a fluid oxidant into dual contact with the cathode and electrolyte. When necessary or desired, the electrolyte compartment is divided into an anolyte compartment and a catholyte compartment, e.g., by an ion-permeable partition or ion-exchange membrane. Thus, in each such fuel cell, a fluid fuel is passed to the anode and there oxidized electrochemically, giving up electrons to the anode, while a fluid oxidant is passed to the cathode and there reduced upon receiving electrons from such cathode.

The term "electrolytic cell" is used herein and in the art to denote a device, system or apparatus which, unlike the aforementioned fuel cell, does not provide a net production of electrical energy but does provide for the anodic oxidation of an organic fuel at the anode of the cell. In such cells a direct current of electrical energy from an external source, e.g., a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g., conversion of alcohols to ketones, hydrocarbons to carboxylic acids, etc.

In most of the cells of the type hereinbefore described, catalysts are employed to promote the reactions within the cell. The term "cathodic reduction catalysts" is employed herein to include catalysts which are associated with the cathode reaction, e.g., oxygen reduction, of an electrochemical cell. These catalysts usually are an integral part of the cathode or anode but in some applications the catalysts are not a part of the electrode. For example, the catalysts may be employed in the form of an electrolyte slurry.

SUMMARY OF THE INVENTION

It has now been found that mixed valency transition metal perovskites are useful as electrocatalysts for the cathodic reduction of an oxidant in an electrochemical cell.

In general, the electrocatalysts of this invention are ionic crystals having perovskite structure and comprising a solid solution of oxides containing a transition metal present in two valency states. Thus, the electrocatalyst is a solid solution of at least two oxides arranged in a perovskite structure wherein each oxide contains a common transition metal provided that said common transition metal is present in two different valency states. The perovskite electrocatalyst of the invention is defined by the general stoichiometric formula $A_xA'_yBO_3$ (actually this is a solid solution of $xABO_3$ and $yA'BO_3$) where A and A' are nontransition metals; where $x$ and $y$ are numbers ranging from 0.0 to 1.0 and the sum of $x$ and $y$ is 1.0; where B is a nonnoble transition metal present in two different valency states (e.g., +3 and +4); and 0 represents oxygen. In the above formula A and A' are nontransition metals selected from IA, IIA, and IIIB (including rare earth elements) of the Periodic Table such as La, Y, Ba, Sr, K, Rb, Ce, etc., and B is a nonnoble transition metal selected from Groups IVB, VB, VIB, VIIB and VIII of the Periodic Table, such as Ti, V, Cr, Mn, Fe, Co, Ni, Nb, Mo, Ta, and Zr. The Periodic Table referred to herein is that described in "Encyclopedia of Chemistry," Reinhold Publishing Corporation, 2nd Edition (1966) at page 790. Specific examples of the perovskite catalysts of this invention include, among others, $La_{0.7}Ba_{0.3}CoO_3$, $La_{0.7}Ba_{0.3}TiO_3$, $La_{0.7}Ba_{0.3}MnO_3$, $La_{0.7}Ba_{0.3}FeO_3$, $La_{0.5}Sr_{0.5}CrO_3$, $La_{0.5}Sr_{0.5}CoO_3$, $Y_{0.5}Sr_{0.5}CoO_3$, and $Na_{0.5}Sr_{0.5}MoO_3$. As mentioned above, such catalysts may or may not be an integral part of the cathode. These catalysts have not been found to be particularly stable in acid media and accordingly, the catalyst is preferably used in alkaline media such as potassium hydroxide, sodium hydroxide, lithium hydroxide, etc.

The aforedescribed perovskites per se and their methods of preparation are well known and are adequately described, for example, in the following references which are incorporated herein by reference; A. F. Wells, "Structural Inorganic Chemistry," p. 375, 2nd Edition, Oxford Press, 1950; G. H. Jonker and J. H. VanSanten, *Physica*, 16, 599 (1950); G. H. Jonker and J. H. VanSanten, *Physica*, 19, 120 (1953); and H. L. Yakel, Jr., Acta. Cryst., 8, 394 (1955).

In general, the perovskite structure is assumed by many oxides of composition, $ABO_3$, where A is a large cation, B is a small cation, and the sum of the valences of A and B is six. The large anions and the oxide ions form a close packed cubic arrangement in which the anions occupy the corners and the oxide ions occupy the face centers of the unit cells. The small B cations are located at the body centers (octahedral holes) of cell. cubic cells In order to maintain a stable perovskite configuration the radii of the A, B, and oxide $(0^=)$ ions must usually satisfy a characteristic relationship, namely, $r_A + r_0 = |r_B + r_0 = \sqrt{2}$.

Perovskites containing transition metal ions at the B sites may conduct electricity when the B ions are present in two different valency states. This condition can be satisfied by forming solid solutions of two perovskites, $ABO_3$ and $A'BO_3$, where A and A' are nontransition metals of different valency but nearly the same ionic size. The aforedescribed perovskites of the invention are of this type. A and A' are the metals set forth above but for the purposes of this invention it is preferred that one be a lanthanide and that the other be a large alkaline earth metal such as Sr or Ba. B is preferably a first row transition metal with stable +3 and +4 oxidation states such as Ti, V, Cr, Mn, Fe, Co, or Ni. By way of illustration, solid solutions of the two nonconductive perovskites $La^{+3}Ti^{+3}O_3$ and $Ba^{+2}Ti^{+4}O_3$ are conductive because these solutions (which may be represented as $La_xBa_yTiO_3$ or $xLaTiO_3 \cdot yBaTiO_3$ where $x+y=1$) contain both trivalent and tetravalent titanium at equivalent lattice sites (the octahedral holes).

Electrodes containing the perovskite catalysts of the invention may be prepared in a conventional manner. In general, an electrode may be prepared by compressing the mixed valency nonnoble perovskite into a conductive support material such as a nickel or Monel screen. A convenient method is to mix a desired perovskite with an aqueous emulsion containing 5 to 10 percent by weight polytetrafluoroethylene, e.g., Teflon, at ambient temperatures and applying the resultant paste to a Monel screen. The electrode may then be formed by pressing the coated screen at elevated temperatures, e.g., 500°–700° F. and under high pressures, e.g., 1,000–2,000 p.s.i.g.

The following examples demonstrate the effectiveness of the perovskites of this invention as catalytic materials for electrochemical electrodes.

DESCRIPTION OF THE PREFERRED EMBODIMENTS

EXAMPLE 1

Electrodes containing the stoichiometric compositions $La_{0.7}Ba_{0.3}TiO_3$, $La_{0.7}Ba_{0.3}MnO_3$, $La_{0.7}Ba_{0.3}FeO_3$ or $La_{0.7}Ba_{0.3}CoO_3$ were prepared in the following manner.

The perovskite itself was prepared by firing an appropriate mixture containing the aforedescribed stoichiometric amounts of $La_2O_3$, BaO with TiO or MnO or FeO or CoO at about 1,100° C. in air for about 24 hours. Electrodes containing the resulting perovskites were prepared by mixing one gram of a perovskite powder (325 mesh) with 0.11 gram Teflon (duPont Teflon 42) suspended in 0.26 ml. of water at room temperature (75° F.) until a consistent paste was formed. Resulting paste was then applied to both sides of a 50 mesh Monel screen to form a disk of 5.4 square centimeters in area. The coated screen was then passed in a hydraulic press maintained at room temperature and 1,100 p.s.i. for about 1 minute and then at 625° F. and 1,100 p.s.i. for about 1 minute.

EXAMPLE 2

The electrodes prepared in Example 1 were tested as cathodes in a half cell employing oxygen or nitrogen gas in 6 N-potassium hydroxide solution at 90° C. The following data were obtained employing a standard calomel electrode as the reference electrode.

OPEN CIRCUIT POTENTIALS OF MIXED VALENCY TRANSITION METAL PEROVSKITES

| Composition | Polarization Vs. Reversible Oxygen at Zero Current | | |
|---|---|---|---|
| | $O_2$* (Volts) | $N_2$* (Volts) | Δ (Millivolts) |
| $La_{0.7}Ba_{0.3}TiO_3$ | 0.310 | 0.375 | 65 |
| $La_{0.7}Ba_{0.3}MnO_3$ | 0.240 | 0.365 | 125 |
| $La_{0.7}Ba_{0.3}FeO_3$ | 0.270 | 0.355 | 85 |
| $La_{0.7}Ba_{0.3}CoO_3$ | 0.110 | 0.142 | 32 |

*Gas flow rate of 30 cc./minute.

Comparing the difference in open circuit potentials between oxygen and nitrogen gas feeds, it is seen that the perovskites of this invention are effective cathode catalysts.

EXAMPLE 3

The aforedescribed electrode comprising $La_{0.7}Ba_{0.3}CoO_3$ was mounted in a glass half-cell apparatus, consisting of 6 N KOH electrolyte, a graphite rod counterelectrode and a Lugen capillary calomel reference electrode. The cell temperature was raised to 90° C. and potentials of the electrode vs. the reference electrode were recorded at various current densities with oxygen gas flowing over the electrode surface. The performance the electrode as a cathode (potentials referred to reversible oxygen electrode) is demonstrated by the data obtained and presented below.

TABLE II

PERFORMANCE OF $La_{0.7}Ba_{0.3}CoO_3$ ON OXYGEN AT 90° IN 6 N POTASSIUM HYDROXIDE

| Current Density (ma./cm.²) | Volts Polarized From Reversible Oxygen |
|---|---|
| 0.0 | 0.110 |
| 1.0 | 0.190 |
| 5.0 | 0.260 |
| 10.0 | 0.290 |
| 20.0* | 0.330 |
| 40.0 | 0.480 |
| 60.0 | 0.790** |

*With nitrogen flowing at 20 ma./cm.², electrode rapidly polarized to above 1 volt from reversible oxygen.
**Rapid polarization at 60 ma./cm.².

It is to be understood that the examples presented herein are intended to merely be illustrative of the invention and not as limiting it in any manner; nor is the invention to be limited by any theory regarding its operability. The scope of the invention is to be determined by the appended claims.

What is claimed is:

1. In an electrochemical cell comprising an inert anode, an inert cathode, an aqueous alkaline electrolyte, means for supplying a fluid fuel to said anode, and means for supplying a fluid oxidant to said cathode, the improvement wherein said cathode comprises an electrically conductive base support and a catalyst comprising a mixed valency nonnoble metal perovskite having the general formula $A_xA'_yBO_3$ wherein A is a metal selected from Groups IA, IIA and IIIB of the Periodic Table, A' is a metal having a valence different from that of A and selected from Groups IA, IIA and IIIB of the Periodic Table, and B is a nonnoble transition metal selected from Groups IVB, VB, VIB VIIB and VIII of the Periodic Table, and the sum of $x$ and $y$ is 1, said perovskite being a solid solution of a first oxide having the formula $ABO_3$, and a second oxide having the formula $A'BO_3$, said metal B having one valency state in said first oxide and a second valency state in said second oxide, the sum of the valences of A and B in said first oxide being 6 and the sum of the valences of A' and B in said second oxide being 6.

2. An electrochemical cell according to claim 1 in which A is a lanthanide series metal and A' is an alkaline earth metal.

3. A cell according to claim 2 in which said alkaline earth metal is strontium or barium.

4. A cell according to claim 1 in which B is a first row transition metal with stable +3 and +4 oxidation states.

5. A cell according to claim 4 in which B is titanium, vanadium, chromium, manganese, iron, cobalt or nickel.

6. In a fuel cell comprising an inert anode, an inert cathode, aqueous alkaline electrolyte, means for supplying a fluid fuel to said anode and means for supplying a fluid oxidant to said cathode, the improvement wherein said cathode comprises an electrically conductive base support and a catalyst comprising a mixed valency nonnoble metal perovskite having the general formula $A_xA'_yBO_3$ wherein A is a metal selected from Groups IA, IIA and IIIB of the Periodic Table, A' is a metal having a valence different from that of A and selected from Groups IA, IIA and IIIB of the Periodic Table and B is a nonnoble transition metal selected from Groups IVB, VB, VIB, VIIB and VIII of the Periodic Table, and the sum of $x$ and $y$ is 1, said perovskite being a solid solution of a first oxide having the formula $ABO_3$ and a second oxide having the formula $A'BO_3$, said metal B having one valency state in said first oxide and a second valency state in said second oxide, the sum of the valences of A and B in said first oxide being 6 and the sum of the valences of A' and B in said second oxide being 6.

* * * * *